April 9, 1940. J. J. WHISLER 2,196,541
ICE BLOCKING AND TRIMMING MACHINE
Filed May 11, 1939 2 Sheets-Sheet 1
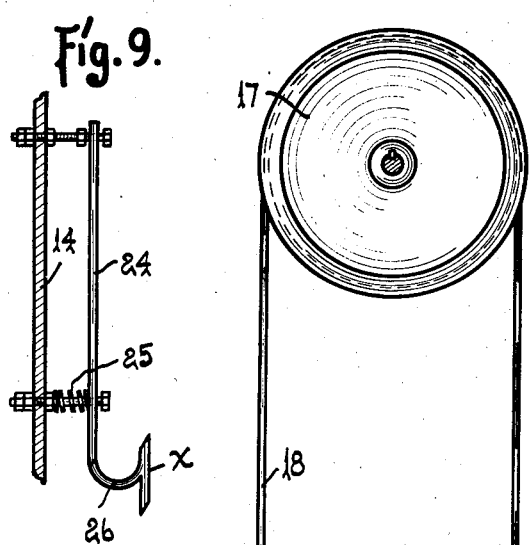
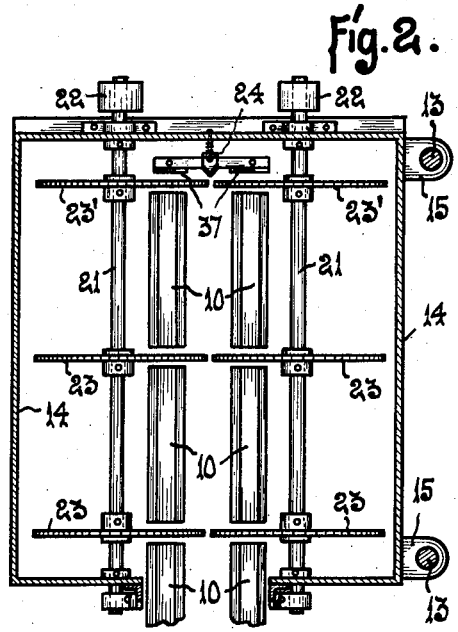
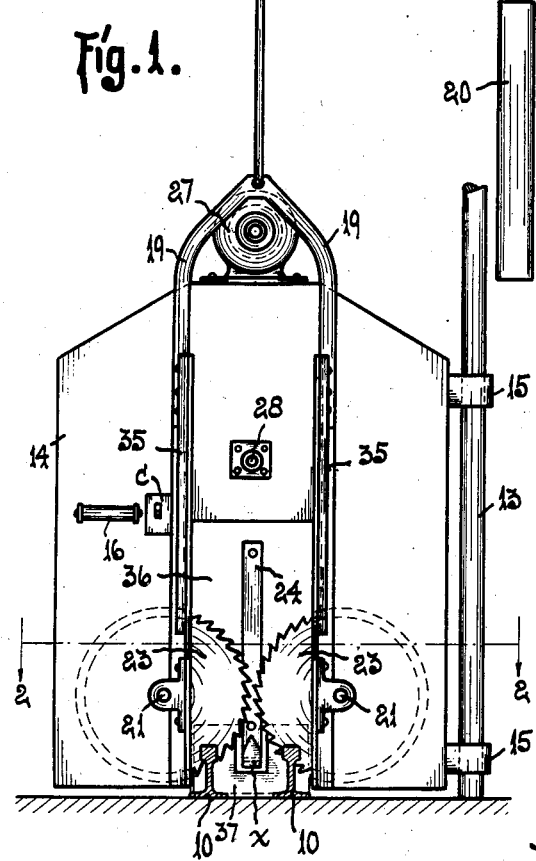
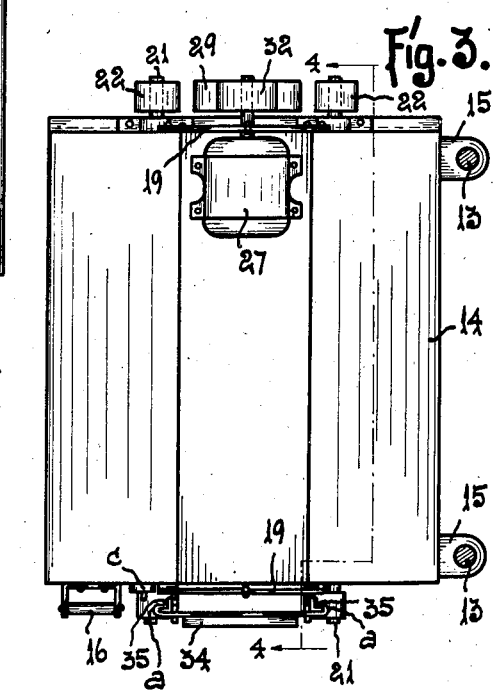
Inventor
Jesse J. Whisler,
By
Hiram A. Sturges Attorney April 9, 1940. J. J. WHISLER 2,196,541
ICE BLOCKING AND TRIMMING MACHINE
Filed May 11, 1939 2 Sheets-Sheet 2
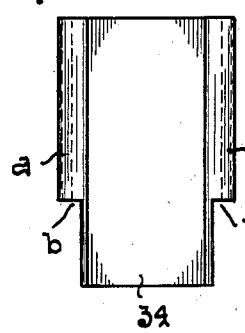
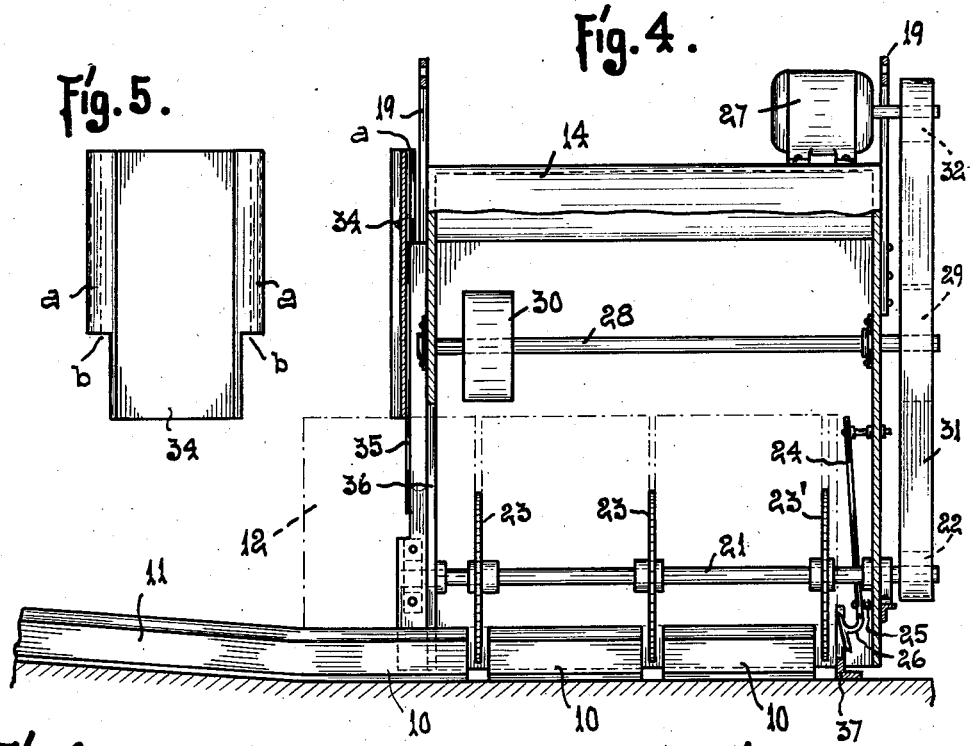
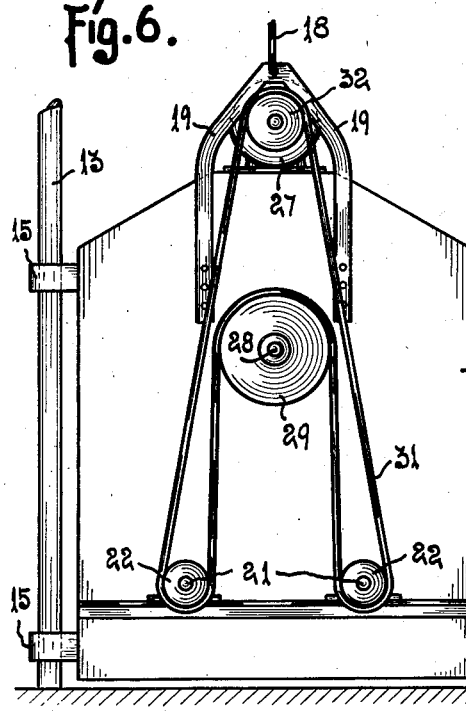
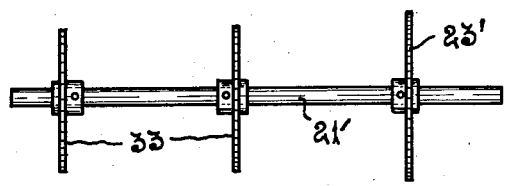
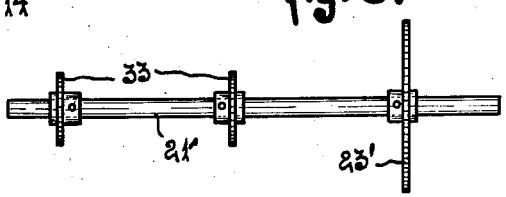
Inventor
Jesse J. Whisler,
By
Hiram A. Sturges
Attorney Patented Apr. 9, 1940

2,196,541

UNITED STATES PATENT OFFICE 2,196,541

ICE BLOCKING AND TRIMMING MACHINE

Jesse J. Whisler, Farragut, Iowa

Application May 11, 1939, Serial No. 273,057

8 Claims. (Cl. 125—13)

This invention relates to a machine for cutting and trimming elongated cakes of ice to form ice-blocks or cubes of perfect shape and practical sizes for retail distribution.

The invention is shown and described in connection with an ice chute and bed for supporting the ice cake during the operation of cutting and trimming.

The principal objects in view have been to provide a machine of few and simple parts to occupy a limited space in an ice plant, and will require a limited power for operation, will form perfect ice-blocks rapidly, and will consist of parts which will be convenient for operation.

The invention includes scoring or formation of transversely disposed grooves in the elongated ice cakes as well as the formation of blocks or cubes.

The invention consists, broadly, of a vertically movable carrier, casing or housing-cap of rectangular form, in plan, for containing practically all of the mechanism, said housing-cap or carrier and ice-cutting mechanism therein and thereon being counterbalanced for convenience, and adapted to have downward sliding movements in vertical guides for cutting and trimming, and to have upward sliding movements from an ice-supporting bed to permit removal of ice cubes and an intake of uncut ice cakes, the feature of counterbalancing being depended upon for easy manual control.

The invention employs a vertically movable carrier or housing-cap of box-form, open at its bottom and provided with an endwall opening for receiving an uncut ice cake from an ice-chute, and includes automatic means for closing said opening. The invention also includes an ice-trimmer which operates automatically.

With the foregoing objects in view and others hereinafter to appear, the invention presents a new and useful construction, combination and arrangement of parts as described herein and claimed, and as illustrated in the accompanying drawings, it being understood that changes may be made in form, size, proportions and minor details as may be found of advantage, said changes being within the scope of the invention as claimed.

In the drawings, Fig. 1 is a view of the invention in front elevation, the carrier or housing-cap being disposed in its lowermost position.

Fig. 2 is a transverse section on line 2—2 of Fig. 1, and Fig. 3 is a plan view of the machine, the vertical standards or guide-members being in section.

Fig. 4 is a view of the carrier or housing-cap in side elevation, a part of the covering being broken away, and the vertical guide-members being omitted.

Fig. 5 is a side view of a slidable guard-plate. Fig. 6 is a rear end view of the machine.

Figs. 7 and 8 are detail views to show that the machine may be used for cutting ice cakes into blocks or cubes of various proportions, and may also be used for scoring ice cakes. Fig. 9 is an enlarged detail view showing a scraper blade.

Referring now to the drawings for a more particular description, the invention is shown and described in connection with a stationary, horizontal ice-supporting bed 10 with its inclined chute 11, a cake of ice 12 on the bed being shown in dotted lines.

I provide a vertical guide means of any suitable construction, a pair of stationary, vertical standards or guide-members 13 being shown.

I provide a carrier or rectangular casing or housing-cap of box-form indicated at 14, adapted to contain and provide bearings for nearly all of the mechanism required for operation. It is provided on one of its sides with ring-brackets 15 which encircle the guide-members 13 so that said housing-cap may have accurate vertical movements.

In order that the housing-cap 14 and parts carried thereby may be easily moved upwardly or downwardly by an operator by manual use of a handle 16 secured to the front end, any suitable arrangement of parts may be provided, such as a pair of pulleys 17 (only one pulley being shown) each being disposed above an end of the housing-cap and provided with a cable 18 attached at one end to an arcuate strap 19 which projects above the top of the housing-cap at an end thereof, the opposite end of each cable being provided with a weight 20. Since the cables 18 will be disposed parallel with the vertical guide-members 13 it is obvious that the weight of these movable operating parts may be balanced by the weights 20, and that friction may be overcome by a limited manual force applied to the handle 16.

As shown in the drawings the vertical guide-members 13 are disposed in a plane parallel with the longitudinal axis of the housing-cap. Also the ice-supporting bed is disposed parallel with said axis, midway between the opposed sides of the housing-cap, and these features are necessary in order that the operation of sawing and trimming may be carried on in the formation of perfectly shaped ice-blocks.

I provide a pair of rotatable, relatively parallel shafts 21 each having bearings at its ends in the end-walls of the housing-cap 14, each shaft 21 being provided with a pulley 22, and at 23 are indicated a plurality of circular saws which are removably mounted on said shafts, these saw-members 23 being arranged in opposed relation, in pairs, at selected longitudinal intervals; and during operation, when the housing-cap is moved downwardly, the saws will cut the ice cake from its top toward its bottom, each saw of a pair operating to cut through, approximately, one-half of the width of the ice cake.

Numerals 23' indicate a pair of trimmer saw-members for trimming the soft end of ice cakes. During the operation of producing ice cakes the top of each cake presents a rough, softened condition, and in order that a smooth, solid end-surface may be produced, the pair of saws 23' are provided for removing the end of the ice cake.

Since the downward movement of the housing-cap 14 does not continue a sufficient distance to carry the saw-members below the bed 10 the pairs of saws, as described, will not completely sever the ice cake, but will leave an uncut portion of triangular form at the bottom, midway between the sides of the ice cake, and therefore a scraper blade 24 shown in Figs. 1, 2, 4 and 9 is used.

This scraper blade is not considered to be necessary to operation, but since it is important to use the trimmer saw-member 23' in the production of solid marketable ice blocks, the scraper blade is of advantage in removing the undetached slice of ice formed by the operation described.

By referring to Fig. 9 of the drawings it will be seen that the upper end of the scraper-blade is adjustably secured to the rear wall of the housing-cap 14, and by control of a spring 25 any pressure of the blade toward said wall is resisted. The lower end of the blade is provided with a hook 26 with a terminal knife $x$ having upper and lower sharp edges. In the operation of cutting an ice cake into blocks, the flat portion $x$ will be pressed against the soft or rough end of the ice cake, and while the assembly moves downwardly the projecting part of the scraper-blade will be pressed against the end but will not resist the downward movement of said assembly.

When the assembly reaches its lowermost position the knife $x$ will cause detachment of the "slice" of soft ice, and, by action of spring 25, the sharp, inclined edge of the part $x$ will scrape the surface of the newly formed ice block while the assembly moves upwardly.

The operating-shafts 21 are driven by power from an electric motor 27. Numeral 28 indicates a counter-shaft provided at its outer end with a pulley 29 and also provided with a balance wheel 30; and by means of a drive belt 31 which engages the motor pulley 32, the pair of pulleys 22 and pulley 29, the shafts 21 are rotated for the purpose of cutting ice cakes into blocks.

The shafts 21' shown in Figs. 7 and 8 correspond in proportions to the shafts 21. These shafts 21' are provided with circular saw-members 33 varying in diameter so that scoring may be accomplished at suitable depths. All saw-members are removably mounted on the shafts, so that substitution of shafts may be readily made. In operation, the ice cakes, which generally have a weight of 300 lbs. are cut to provide blocks of suitable sizes, but in some instances, scoring is required.

Numeral 34 indicates a guard-plate (Figs. 3, 5) having flanges $a$ at its opposed side edges, said flanges being of curved form so that the guard-plate may have vertical sliding movements with its flanges engaging the vertically disposed strips 35 of angle iron which are secured to the front end of the housing-cap at the edges of an intake-opening 36 which is provided for said housing.

This opening 36, best shown in Figs. 1 and 6, is of such height and width that it will receive the ice cake. When the assembly moves downwardly the walls of the housing-cap 14 will, approximately, surround the ice cake. The guard-plate 34 will slide downwardly on the strips 35 by action of gravity and its lower edge will engage the ice cake. While the assembly slides downwardly the plate 34 will slide upwardly, and when the saw assembly is raised, plate 34 will slide downwardly to cover the opening 36.

The use of this slide plate is of great advantage, since it tends to confine all particles or speculae of detached ice, during the operation of sawing, to the housing-cap and prevents the particles of ice from being thrown therefrom; and, when the opening is not occupied by an ice cake the plate 34 will be disposed at the front of the saw-members 33 to protect them from exposure or injury. The plate 34 is provided with ledges $b$ which limit the downward sliding movement of said plate.

At $c$ is indicated an electrical push-button for use of an operator, and after an ice cake has been placed in position on the ice supporting bed 10 the operator may close an electrical circuit by use of the member $c$ to cause suitable momentum for the saws; and by use of the handle 16 the assembly or housing-cap may be pulled downwardly to cause engagement of the saws with the ice.

At 37 (Figs. 2 and 4), is indicated a stop-member which is secured to the ice-supporting bed 10 for limiting the movement of an ice cake when the latter is moved to operative position from the chute.

While I have shown two driven shafts 21, provided with three circular saws for forming three ice blocks, it is obvious that the principle of operation would be the same if a lesser number of pairs was employed, and I do not wish to be understood as limiting myself to the number of pairs, and if a single pair of saw-members is used in forming ice blocks from an elongated ice cake, it is obvious that the assembly could be elevated and lowered in producing each ice block.

I claim as my invention:

1. A machine for the purposes described comprising, in combination with a supporting-bed for uncut ice, upright, stationary guide means, a weight-balanced rectangular housing-cap disposed above the ice-supporting bed slidingly engaging the guide means and provided with a doorway for receiving an ice cake, a guard-plate slidingly mounted in said doorway, and a pair of relatively parallel, rotatable shafts journalled in the housing-cap and provided with opposed saw-members for engaging the ice cake during a sliding movement of said housing-cap.

2. A machine for the purposes described comprising, in combination with an ice-supporting bed, a pair of upright, stationary guide-members, a weight-balanced housing-cap engaging the guide-members, a pair of relatively parallel, rotatable shafts journalled in the housing-cap, opposed saw-members disposed in pairs at longitudinal intervals on the shafts, a pair of opposed, terminal, trimmer saw-members on said shafts, and a spring-controlled scraper blade on the housing-cap, said housing-cap being arranged for sliding movements on the guide-members to cause engagement of said saw-members and scraper blade with ice on said ice-supporting bed.

3. A machine for the purposes described comprising in combination, a stationary elongated bed for supporting uncut ice, a pair of vertical guide-members disposed at a side, in a plane parallel with the longitudinal axis of the ice-supporting bed, a weight-balanced, rectangular housing-cap mounted to permit sliding movements on the guide-members and provided with a doorway for receiving the uncut ice, a guard-plate slidingly mounted in the doorway into engagement with said ice, a pair of rotatable shafts journalled in the housing-cap, and a plurality of saw-members disposed opposite to each other in pairs at selected longitudinal intervals and removably secured to the shafts, said housing-cap being movable upwardly to permit a deposit of uncut ice on said ice-supporting bed, and being movable downwardly to permit engagement of the saw-members with said uncut ice.

4. A machine for the purposes described comprising, in combination, a horizontal, stationary bed for supporting an uncut ice cake, a stationary vertical guide-means at the side of the stationary bed, a rectangular weight-balanced housing-cap slidably mounted on the guide-means and having a doorway for receiving the uncut ice cake, a guard-plate slidably mounted in said doorway, a pair of rotatable, parallel shafts journalled in opposed walls of the housing-cap, and a plurality of opposed saw-members arranged in pairs and mounted on the shafts, said housing-cap being adapted to have a downward movement to permit engagement of the saw-members and guard-plate with the ice cake on said bed.

5. A machine for the purposes described comprising, in combination, a stationary ice-supporting bed, stationary vertically disposed guide-means, a weight-balanced housing-cap slidably mounted on the guide-means, a pair of parallel, rotatable shafts journalled in the housing-cap, a plurality of opposed saw-members arranged in pairs at intervals and secured to the shafts, a pair of opposed trimmer saw-members secured to said shafts, and a scraper blade adjacent the pair of trimmer saw-members resiliently mounted on the housing-cap, said housing-cap being movable to cause engagement of the saw-members and scraper blade with ice on said ice-supporting bed.

6. A machine for the purposes described, comprising an ice-cake supporting-bed, a pair of standards at one side of the bed, a weight-balanced carrier of inverted box-form slidingly mounted on the standards having a doorway in its front and opening on its bottom, channel-strips on the carrier at the sides of the doorway, a guard-plate having side flanges slidingly engaging the channel-strips, and mechanism including rotatable saw-members within the carrier, said carrier being movable downwardly to permit engagement of the saw-members with said ice-cake and permitting the walls of said carrier to be disposed enclosingly at the sides of the ice-cake supporting-bed for confining particles of ice cut away by action of the saw-members to the interior of said carrier.

7. In a machine for the purposes described, a horizontal ice-cake supporting-bed, stationary guide means at one side of the bed, a weight-balanced carrier of inverted box-shape slidingly mounted on the guide means, a pair of opposed, horizontal, rotatable shafts journalled in the carrier, scoring-saws disposed in opposed relation in pairs and secured to the shafts, a pair of opposed trimmer-saws each mounted upon and near a terminal of a shaft, said carrier being movable downwardly to permit engagement of the scoring saws with the ice-cake at intervals thereof and permitting engagement of the trimmer-saws upon and at a terminal part of said ice-cake.

8. A machine for the purposes described comprising an ice-cake supporting-bed, a pair of standards at one side of the ice-supporting-bed, a weight-balanced carrier of inverted box-shape having a doorway in its front end opening on its bottom for receiving the ice-cake, a guard-plate slidingly mounted for closing a part of the doorway, sawing-mechanism arranged to be actuated and mounted in the lower part of the carrier, said carrier being downwardly movable to a point below the ice-supporting-bed for engagement of the sawing-members with the ice-cake.

JESSE J. WHISLER.